(12) United States Patent
Takashima et al.

(10) Patent No.: US 6,438,169 B1
(45) Date of Patent: Aug. 20, 2002

(54) VIDEO SIGNAL COMPRESSING METHOD AND APPARATUS, AND COMPRESSED DATA MULTIPLEXING METHOD AND APPARATUS

(75) Inventors: Masatoshi Takashima; Daisuke Hiranaka, both of Tokyo; Eiji Ogura, Saitama; Katsumi Tahara, Kanagawa; Noriaki Oishi, Kanagawa; Mikita Yasuda, Kanagawa; Shinji Negishi, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/261,360

(22) Filed: Mar. 3, 1999

(30) Foreign Application Priority Data

Mar. 5, 1998 (JP) .............................. 10-053990

(51) Int. Cl.[7] .............................. H04N 11/02
(52) U.S. Cl. ................................. 375/240.05
(58) Field of Search ............................ 348/44; 370/537, 370/94.1; 386/98; 375/240.05, 240.01, 240.31, 240.07

(56) References Cited

U.S. PATENT DOCUMENTS 5,646,693 A * 7/1997 Cismas ........................ 348/44
6,285,689 B1 * 9/2001 Negishi et al. ............. 370/537

OTHER PUBLICATIONS

Applicants Specification: Figures 8–1, and pp. 1–6.*

* cited by examiner

Primary Examiner—Chris Kelley
Assistant Examiner—George Bugg
(74) Attorney, Agent, or Firm—Frommer Lawrence & Haug LLP; William S. Frommer; Gordon Kessler

(57) ABSTRACT

A video signal compressing method and a video signal compressing apparatus for compressing a video signal for a system in which for a synchronism between a plurality of compressed signals must be maintained. A presentation time stamp and/or a decode time stamp are multiplexed in a stream for transmission in which a video signal is compressed to generate a compressed signal. The following are generated as access unit information (AUI) for use in multiplexing the compressed data of the video signal: a picture size value, a picture type value, a repeat first field value, and a flag indicating the occurrence of a big picture.

26 Claims, 11 Drawing Sheets

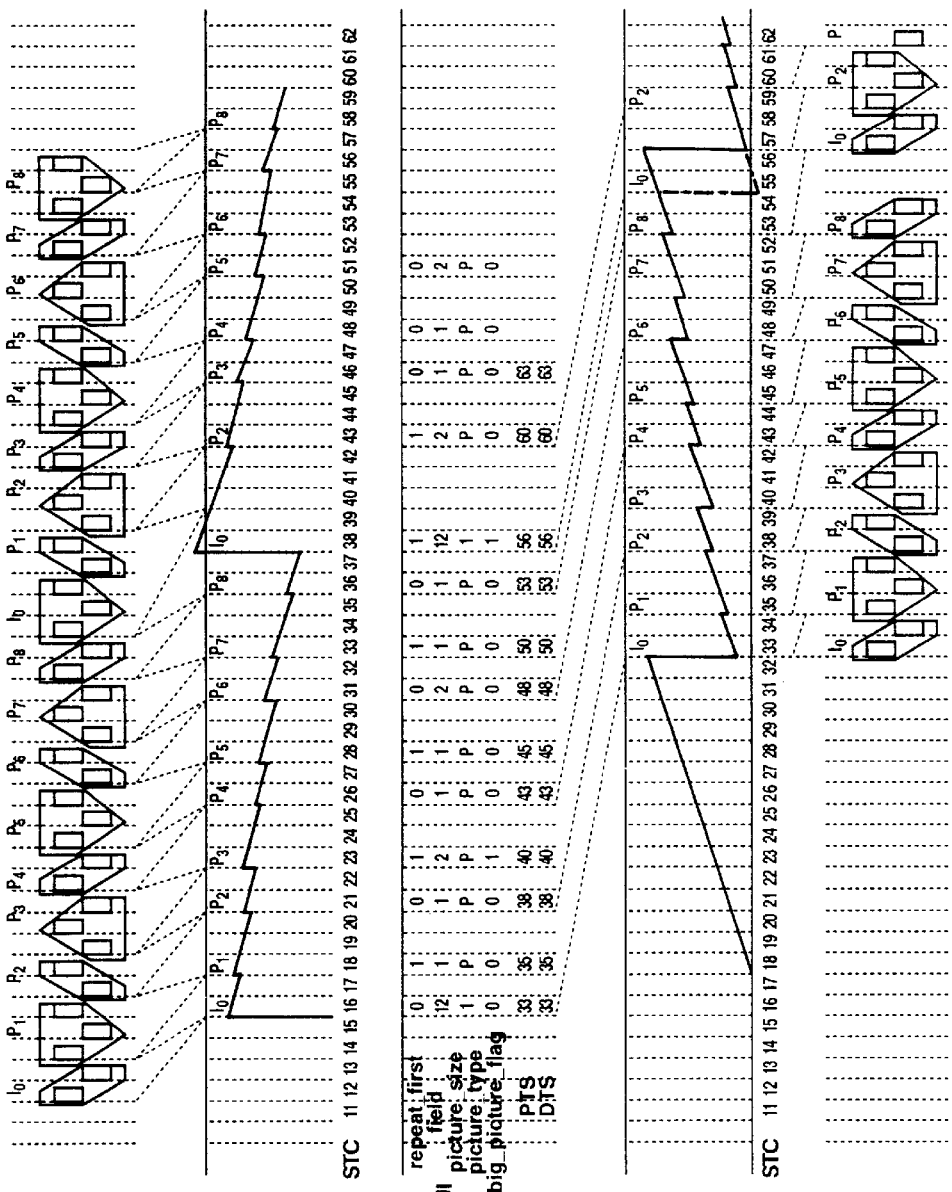
FIG.4A INPUT IMAGE
FIG.4B OUTPUT BUFFER IN ENCODER
FIG.4C CALCULATION OF PTS AND DTS FROM AUI
FIG.4D BUFFER IN DECODER
FIG.4E OUTPUT IMAGE

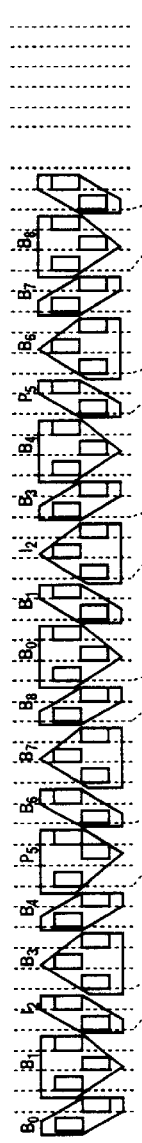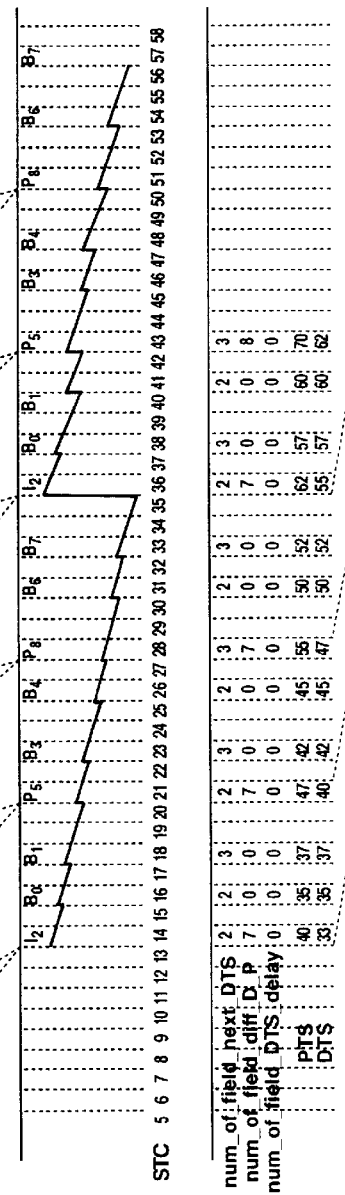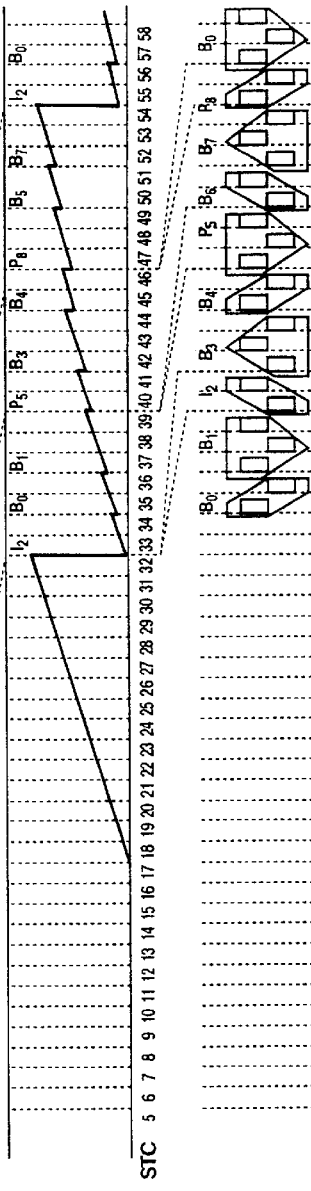
FIG.7A INPUT IMAGE
FIG.7B OUTPUT BUFFER IN ENCODER
FIG.7C CALCULATION OF PTS AND DTS FROM AUI
FIG.7D BUFFER IN DECODER
FIG.7E OUTPUT IMAGE

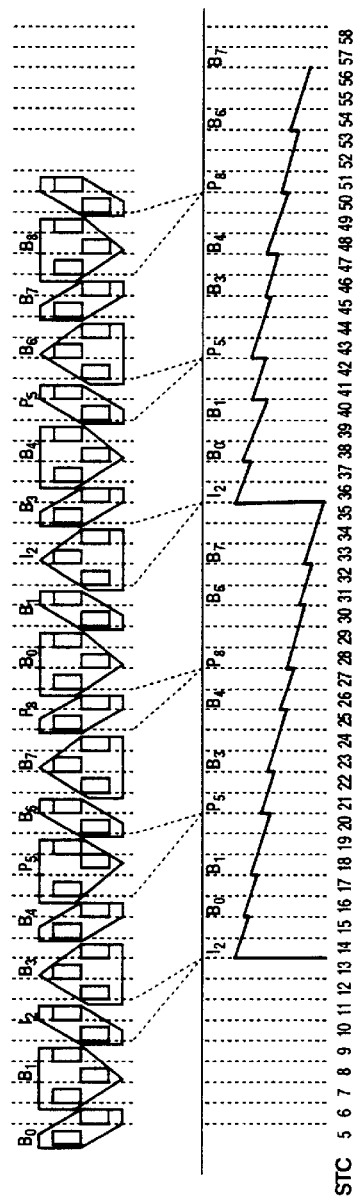
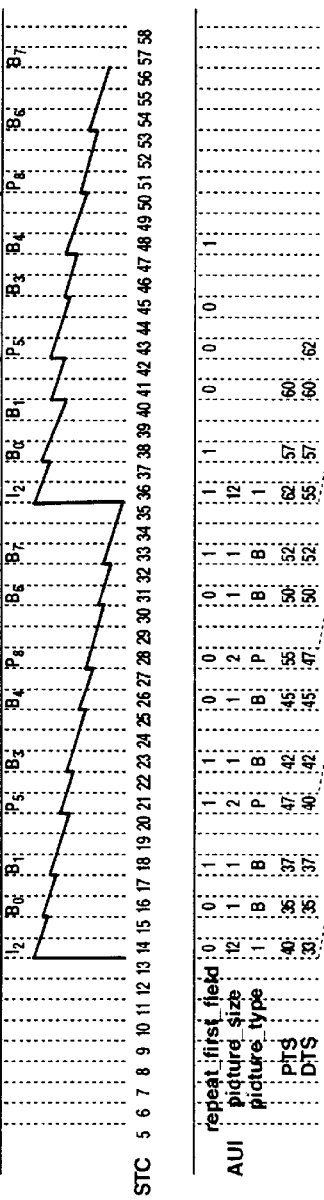
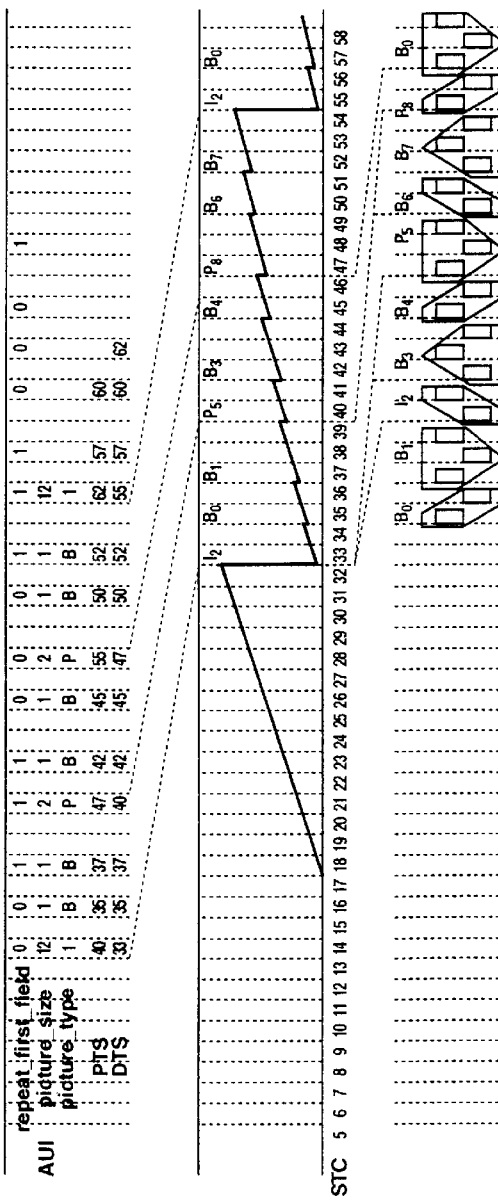
FIG.10A PRIOR ART INPUT IMAGE
FIG.10B PRIOR ART OUTPUT BUFFER IN ENCODER
FIG.10C PRIOR ART CALCULATION OF PTS AND DTS FROM AUI
FIG.10D PRIOR ART BUFFER IN DECODER
FIG.10E PRIOR ART OUTPUT IMAGE

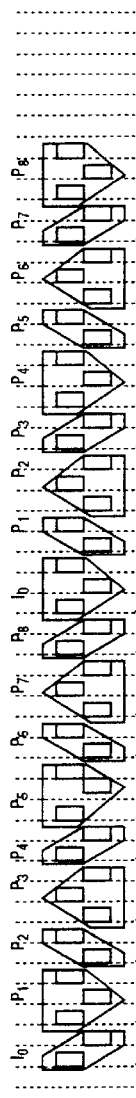
FIG.11A PRIOR ART — INPUT IMAGE
FIG.11B PRIOR ART — OUTPUT BUFFER IN ENCODER
FIG.11C PRIOR ART — CALCULATION OF PTS AND DTS FROM AUI
FIG.11D PRIOR ART — BUFFER IN DECODER
FIG.11E PRIOR ART — OUTPUT IMAGE

VIDEO SIGNAL COMPRESSING METHOD AND APPARATUS, AND COMPRESSED DATA MULTIPLEXING METHOD AND APPARATUS

BACKGROUND OF THE INVENTION

1. Field of the Invention

The present invention relates generally to a video signal compressing method and apparatus, and a compressed data multiplexing method and apparatus, and more particularly to a video signal compressing method and apparatus, and a compressed data multiplexing method and apparatus used in a system in which an output or decode time stamp is multiplexed in a data stream to synchronize a plurality of compressed signals for transmission.

2. Description of the Related Art

The MPEG system standardized by the Working Group (WG) of the ISO/IEC JTC1/SC29 (International Organization for Standardization/International Electrotechnical Commission, Joint Technical Committee 1/Sub Committee 29) is oriented to a time-division multiplexing and transmission of a video signal, an audio signal and other data. For synchronism of the multiplexed signals with each other during time-division multiplexing and transmission, a time stamp is added to each decoding/reproduction unit of data, called "access unit", for each of the video signal, the audio signal and the other data. The time stamp acts as time management information, and indicates when each access unit is to be decoded by a particular decoder, and also includes reproduction/presentation management information called "presentation time stamp (PTS)" and a decoding time management information called "decode time stamp (DTS)".

In a multiplexer operating in accordance with the MPEG system during an encoding process, an access unit information (AUI) is extracted from each of the video and audio encoders and signal multiplexing is performed based upon the extracted access unit information. The conventional MPEG multiplexer uses the following variables, for example, as AUI:

picture_size picture_type repeat_first_field to calculate the time stamps PTS and DTS following the procedure shown in the flow chart shown in FIG. 8. These calculated time stamps are then added to a transmission stream.

At Step C1 in the flow chart in FIG. 8, initialization is performed as follows. A DTS initial value (init_DTS) and a next DTS (next_DTS) to be transmitted are set to be equal. "i" is set to "0". The value of i is a counting variable which counts up one for each access unit in the order of transmission. The last_IP_repeat_first_field is set to "0". The last_IP_repeat_first_field is used to convert a 3-2 pull-down image into an inverse 3-2 pull-down image for encoding. This variable is indicative of the value (0 or 1) repeat_first_field (AUI) of a preceding I picture or P picture. Num_of_field_next_DTS is set to "0". The num_of_field_next_DTS is the time, counted in the unit of fields, until a next DTS. Num_of_field_diff_D_P is set to "0". The num_of_field_diff_D-P is a difference between DTS and PTS values, counted in the unit of fields, for an I or P picture.

The above variables can be calculated from access unit information AUI for a particular encoded data (picture_size, picture_type, repeat_first_field). The operation then proceeds to Step C2.

At Step C2, an access unit information (AUI) for the i-th access unit is acquired. At the next Step C3, a function calc_TimeStamp_infi( ) is performed following a specified procedure that will be discussed below to determine values of num_of_field_next_DTS and num_of_field_diff_D_P. The operation then proceeds to Step C4.

At further Step C4, DTS[i] is set to be equal to next_DTS. Also, PTS[i] is set to be equal to DTS[i]+SCFR/2 num_of_field_diff_D_P as will be described below. Thus DTS and PTS are determined for the i-th access unit. The operation then proceeds to Step C5. At the next Step C5, next_DTS is set to be equal to SCFR/2×num_of_field_next_DTS+DTS[i]. The value of a next DTS is calculated in this manner. The operation then proceeds to Step C6.

At Step C6, the value of the variable i is increased by one. Next, the operation returns back to Step C2 where an AUI for a next access unit is acquired and the above processing is repeated to determine the values of DTS and PTS for the next access unit. The function calc_TimeStamp_infi( ) noted at Step C3 in FIG. 8, is performed according to the procedure shown in the flow chart in FIG. 9.

More particularly, at a first Step D1 in the flow chart in FIG. 9, it is determined whether 3_2_pull_down_flag is set to 1 or not. The 3_2_pull_down_flag is indicative of whether an inverse 3-2 pull-down process has been performed. If the 3_2_pull_down_flag=1, encoding has been performed after an inverse 3-2 pull-down process has been performed, while if the 3_2_pull_down_flag is equal to 0, encoding has been performed without an inverse 3-2 pull-down process. When the result of the determination at Step D1 is answered in the affirmative, namely, when 3_2_pull_down_flag is equal to 1, the operation proceeds to Step D2. However, when the result of the determination is answered in the negative, namely, when 3_2_pull_down_flag is equal to 0, the operation proceeds to Step D6.

At Step D2, it is determined whether the value of M is equal to 1. The M value is indicative of a number of pictures until a next I or P picture. When the result of the determination is answered in the affirmative, namely, when the M value is equal to 1, operation proceeds to Step D3. However when the result of the determination is answered in the negative, namely, if the value of M is not 1, operation preceeds to Step D4.

At Step D3, the value of num_of_field_next_DTS of the access unit is set to 2 and num_of_field_diff_D_P of the access unit is set to 0. Operation then proceeds to Step D4.

At Step D4, it is determined whether picture_type is a B picture. When the determination is answered in the affirmative, namely, picture_type represents a B picture, operation proceeds to Step D3. If the determination is answered in the negative, namely if picture_type does not represent a B picture, operation proceeds to Step D5.

At Step D5, the value of num_of field_next_DTS of the access unit is set to 2 and num_of_field_diff_D_P of the access unit is set to M value×2. The operation then proceeds to the return end.

At Step D6, it is determined whether M value is equal to 1. When the determination is answered in the affirmative, namely, when M value is equal to 1, operation proceeds to Step D7. If the determination is answered in the negative, namely, if M value is not 1, operation proceeds to Step D8.

At Step D7, the value of num_of_field_next_DTS of the access unit is set to 2+repeat_first_field and num_of_field_diff_D_P of the access unit is set to 0. Then the operation proceeds to the return end.

At Step D8, it is determined whether picture_type represents a B picture. When the determination is answered in the affirmative, namely, picture_type represents a B picture, operation proceeds to Step D7. If the determination is answered in the negative, namely, if picture_type dose not represent B picture, operation proceeds to Step D9.

At Step D9, it is determined whether the M value is even or not. If the determination is answered in the affirmative, namely, when the M value is even, operation preceeds to Step D10. When the determination is answered in the negative, namely, if the M value is not even, operation proceeds to Step D11.

At step D10, the value of num_of_field_next_DTS is set to 2+last_IP_repeat_first-field and the value of num_of_field_diff_D-P is set to 5×(M value /2). The operation then proceeds to step D12.

At Step D11, the value of num_of_field_next_DTS of the access unit is set to 2+last_IP_repeat_first_field and num_of_field_diff_D_P of the access unit is set to 5×(M/2). The operation then proceeds to Step D12.

At Step D12, the value of last_IP_repeat_first_field is set equal to repeat_first_field. This value is used as the timing for a next I or P picture.

Thus a time stamp for a video signal is calculated for each access unit in accordance with the attributes of the access unit and is added as a time stamp to the transmitted data stream.

FIGS. 10A to 10E show how an image is input to and output from the standard MPEG system.

As is shown in FIG. 10A, when supplied with a 3-2 pull-down image, for example, the encoder will take every 2 or 3 fields as one picture (in an alternating fashion). The input image having the following picture sequence:

B0, B1, I2, B3, B4, B5, B6, B7, P8, . . .

is encoded in the order of the following sequence:

I2, B0, B1, P5, B3, B4, B8, B6, B7, . . .

as shown in FIG. 10B. In the above sequences, I represents an intra-coded picture (I-Picture), P represents a predictive coded picture (P-Picture) and B represents a bidirectionally predictive coded picture (B-Picture).

FIG. 10B depicts the level of information stored in the output buffer of the encoder according to the system time clock (STC). At STC=14, a first I2 picture is encoded, and an encoded bit is stored into the buffer. STCs are shown at intervals of 1 field. One-field interval is equivalent to SCFR/2. The one-field interval is simplified to take a value of SCFR/2=1.

As shown in FIG. 10C, nearly upon completion of the encoding of one picture, AUI (picture_size, picture_type, repeat_first_field) is output from the encoder. In the multiplexer, the AUI value is acquired and calculated to determine each of the time stamps DTS and PTS, as noted above in accordance with the flow charts of FIGS. 8 and 9.

FIG. 10D depicts the level of information stored in the buffer in the decoder according to STC. At STC=18, a bit stream starts being acquired into the buffer and a first I2 picture is decoded at STC=33 according to the decode time stamp DTS.

FIG. 10E shows how an image is output, the I2 picture decoded at STC=33 is presented for output at STC=40 according to the presentation time stamp PTS. If a sequence extension parameter (sequence_extension) exists immediately after a sequence header (sequence_header) being a start code, the bit stream is determined to be an MPEG-2 bit stream generated by encoding the video sequence in accordance with the MPEG-2 standard. On the other hand, if no sequence extension exists immediately after the sequence header, the bit stream is determined to be an MPEG-1 standard bit stream.

The sequence extension contains a profile_and_level_indication parameter identifying a profile defining a mechanical configuration of a coding/decoding algorithm and a level defining a usable range in each profile, a progressive sequence parameter identifying whether a video sequence is a progressive scan or interlace scan, and a chroma_format parameter identifying the thinning type of a chrominance component, 4:2:0, 4:2:2 or 4:4:4, etc. There is also a flag (low-delay) for implementing a low delay. When this flag is set, the bidirectionally predictive_coded picture (B-Picture) will not be included in the video sequence so that pictures can be aligned with no delay in presentation of a decoded image.

FIGS. 11A to 11E depict how an image is input and output when a big_picture is to be developed with the above-mentioned flag (low_delay) set. When supplied with a 3-2 pull-down image, the encoder will take every 2 or 3 fields as one picture in an alternating fashion as shown in FIG. 11A. The input image having the following picture sequence:

I0, PI, P2, P3, P4, P5, P6, P7, P8, . . .

is encoded in the order of the following sequence:

I0, PI, P2, P3, P4, P5, P6, P7, P8, . . .

as shown in FIG. 11B. FIG. 11B shows an information level of the output buffer in the encoder according to the system time clock (STC). At STC=16, a first I0 picture is encoded, and an encoded bit is stored into the buffer. STCs are shown at intervals of 1 field. One-field interval is equivalent to SCFR/2.

As shown in FIG. 11C, nearly upon completion of the encoding of one picture, AUI (picture_size, picture_type, repeat_first_field) is outputted from the encoder. In the multiplexer, the AUI value is acquired and calculated to determine each of the time stamps DTS and PTS in accordance with the procedure set forth above with respect to FIGS. 8 and 9. As noted above, because a flag (low_flag) for implementing a flag (low- delay) is set, a bidirectionally predictive_coded picture (B-Picture) will not be included in the video sequence so DTS=PTS.

In this example, a big_picture is to be encoded in an I0 picture encoded at STC=38, so that the output buffer will overflow. However, this overflow is a buffer size for decoding by the decoder. The actual encoder has a larger buffer size, so the overflow will not cause any trouble in transmission. Since a big picture has been encoded at STC=38, a next PI picture to be encoded is not encoded but is instead removed.

By calculating the time stamps PTS and DTS following the conventional procedure shown in FIGS. 8 and 9, the time stamps PTS and DTS of an I0 picture in which a big_picture has been encoded will be:

PTS=55

DTS=55

FIG. 11D shows the information level of the buffer in the decoder according to STC and FIG. 11E when an image is output. As shown in FIGS. 11A–11D at STC=18, a bit stream starts being acquired into the buffer. The first I0 picture is decoded at STC=33 according to the decode time stamp DTS, and presented at STC=33 according to the presentation time stamp PTS. However, if a picture is decoded at PTS and DTS calculated following the conventional processing procedure, the output buffer will underflow when decoding a I0 picture in which the above-mentioned big picture (big_picture) has developed, as shown in FIG. 11D.

According to C.7 of the MPEG-2 standard (ISO/IEC 13818-2:1995(E), ITU-T REeC., in case that the big picture (big_picture) is to be developed in a state that the flag (low_delay) is set, the temporal reference (temporal_reference) of the next picture is checked and no decoding of the next picture is performed until sufficient data are accumulated in the buffer. After the data has been accumulated in the buffer, the data in the buffer are decoded. However, it is difficult to effect this operation by a hardware, and the underflow will take place.

When the underflow takes place, only the lower portion of an image will not be updated and the image will momentarily be disturbed.

Some conventional decoders used in the MPEG system automatically detect a 3-2 pull-down in themselves and automatically get into and out of inverse 3-2 pull-down. In this case, the PTS and DTS values will be unfavorable for correct time management unless 3_2_pull_down_flag in Step D1 in the conventional procedure in the flow chart shown in FIG. 9 is changed.

Further, some conventional encoders freely change the M value in the course of an encoding. In this case, the PTS and DTS values will be unfavorable for correct time management unless the M values at Steps D5 to D7, D10 and D11 in the flow chart in FIG. 9 are changed.

OBJECTS OF THE INVENTION

Accordingly, it is an object of the invention to provide a video signal compressing method and apparatus, and a compressed data multiplexing method and apparatus, adapted to avoid a decoder underflow caused by the occurrence of a big picture.

Another object of the invention is to provide a video signal compressing method and apparatus, and a compressed data multiplexing method and apparatus, adapted to give appropriate time stamps PTS and DTS for an encoder which automatically detects a 3-2 pull-down within itself and automatically gets into and out of inverse 3-2 pull-down.

A further object of the invention is to provide a video signal compressing method and apparatus, and a compressed data multiplexing method and apparatus, adapted to calculate appropriate time stamps PTS and DTS for an encoder which freely changes the M value during the course of an encoding process.

Still other objects and advantages of the invention will in part be obvious and will in part be apparent from the specification and drawings.

SUMMARY OF THE INVENTION

Generally speaking, in accordance with the invention, a video signal compressing method and a video signal compressing apparatus for compressing a video signal for a system in which for a synchronism between a plurality of compressed signals, a presentation time stamp and/or a decode time stamp is multiplexed in a stream for transmission are provided in which a video signal is compressed to generate a compressed signal and the following are generated as access unit information (AUI) for use to multiplex the compressed data of the video signal:

picture_size, picture_type, repeat_first_field, and a flag indicating the occurrence of a big picture (big_picture_flag).

Furthermore, a compressed signals multiplexing method and a compressed signal multiplexing apparatus for multiplexing compress signals for a system in which for a synchronism between a plurality of compressed signals, a presentation time stamp and/or a decode time stamp is multiplexed in a stream for transmission are provided in which a video signal is compressed to generate a compressed signal and the following are as access unit information (AUI) for use to multiplex the compressed data of the video signal:

picture_size, picture_type, repeat_first_field, and a flag indicating the occurrence of a big picture (big_picture_flag).

The presentation time stamp and/or the decode time stamp is determined based on the picture_size, picture_type, repeat_first_field and big_picture_flag to multiplex the information in a stream.

The invention accordingly comprises the several steps and the relationship of one or more of such steps with respect to each of the others, and the apparatus embodying features of construction, combination of elements and arrangement of parts which are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which:

FIGS. 4A–4E illustrate how an image is input and output in the MPEG encoding system in accordance with the invention in case a big picture is developed while a flag for implementation of a low delay within a sequence extension is set in an MPEG-2 bit stream;

FIGS. 7A–7E illustrate how an image is input and output in the MPEG encoding system when the decode time stamp and a presentation time stamp are calculated in accordance with the flow chart shown in FIG. 6;

FIGS. 10A–10E illustrate how an image is input and output in the conventional MPEG system when decode time stamp and presentation time stamp are calculated as in the flow chart in FIG. 8; and FIGS. 11A–11E illustrate how an image is input and output in the conventional MPEG encoding system in case a bit-picture image picture is to be developed while a flag for implementation of a low delay within a sequence extension is set in an MPEG-2 bit stream.

DETAILED DESCRIPTION OF THE PREFERRED EMBODIMENT

Figure 1:
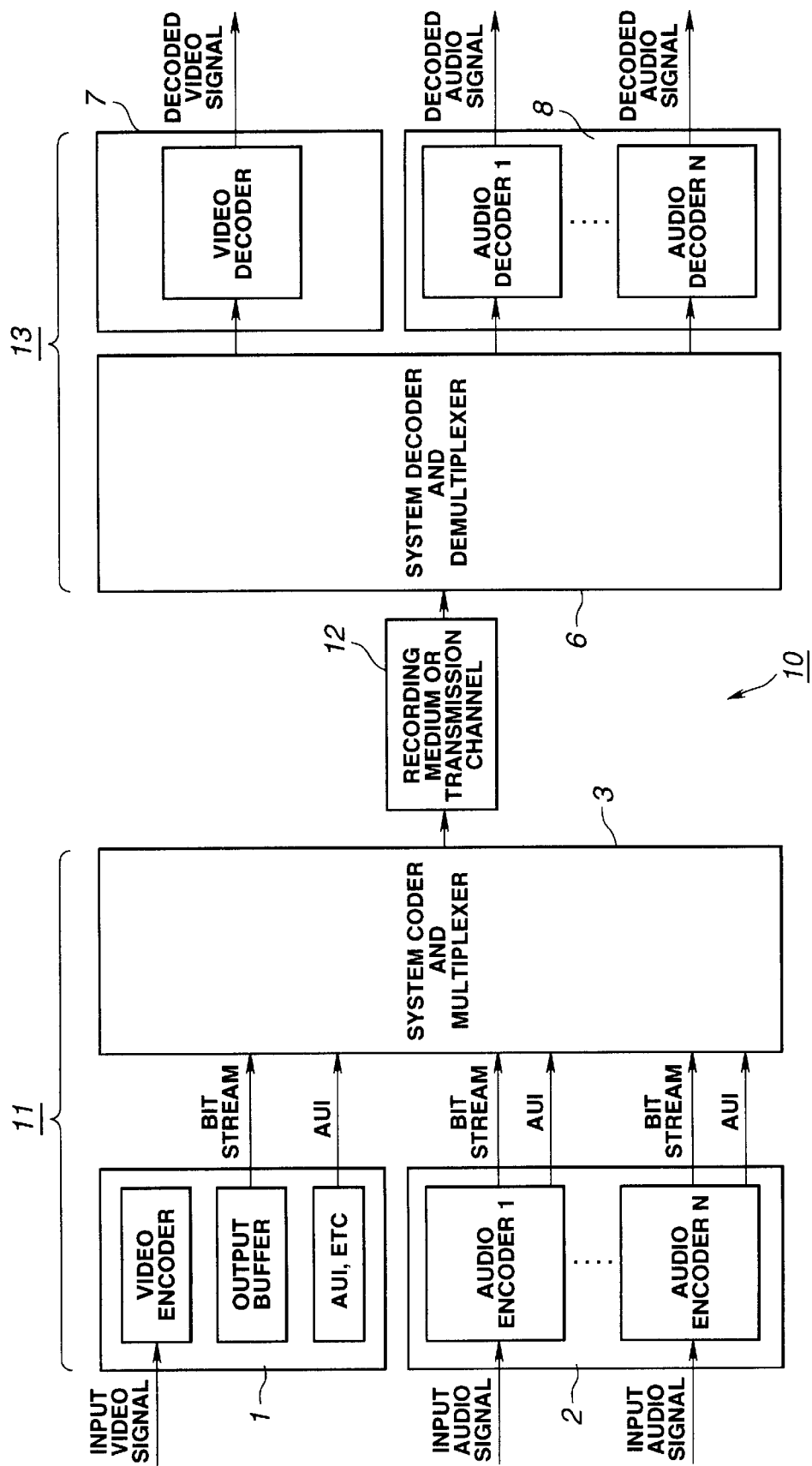
FIG. 1 is a block diagram showing the configuration of an MPEG coding system to which the present invention is applied.

The present invention may be applicable to an apparatus employing the MPEG (Moving Picture coding Experts Group) system standard, for example, as shown in FIG. 1.

Referring first to FIG. 1, an MPEG system 10 comprises an encoding apparatus 11 to multiplex a compressed signal including a 1-channel video signal and N-channel audio signals for transmission, and a decoding apparatus 13 to decode the 1-channel video signal and N-channel audio signals from the signal transmitted from encoding apparatus 11 via a transmission system 12.

Encoding apparatus 11 comprises a video signal encoding unit 1 to which a video signal is supplied, an audio signal encoding unit 2 to which N-channel audio signals are supplied, and a system coder and multiplexer 3.

Video signal encoding unit 1 encodes an input video signal in accordance with the MPEG-2 video standard and provides system coder and multiplexer 3 with a bit stream including a compressed video signal generated by compressing the input video signal and an access unit information (AUI) for use in multiplexing the bit stream. Video signal encoding unit 1 in encoding apparatus 11 is adapted to generate the following parameters as the AUI:

picture_size, picture_type, repeat_first_field, and a flag indicating when a big picture (big_picture) takes place.

Audio signal encoding unit 2 encodes the N-channel audio signals and provides system coder and multiplexer 3 with the bit stream and AUI.

Based on the AUI supplied from video signal encoding unit 1 and audio signal encoding unit 2, system coder and multiplexer 3 multiplexes the bit stream to provide a program stream. In MPEG system 10, the program stream generated by encoding and multiplexing the video and audio signals by encoding apparatus 11 is supplied to decoding unit 13 via transmission system 12 including a recording medium or a transmission channel.

Decoding apparatus 13 comprises a system decoder and demultiplexer 6, a video signal decoding unit 7 and an audio signal decoding unit 8, which correspond to video signal encoding unit 1, audio signal encoding unit 2 and system coder and multiplexer 3 of encoding apparatus 11, respectively.

System decoder and demultiplexer 6 separates a bit stream of video signal and a bit stream of N-channel audio signals from the program stream and supplies the video signal bit stream to video signal decoding unit 7 while supplying the N-channel audio signals bit stream to audio signal decoding unit 8.

Video signal decoding unit 7 decodes the bit stream supplied from system decoder and demultiplexer 6 to reproduce the video signal. Audio signal decoding unit 8 decodes the bit stream supplied from system decoder and demultiplexer 6 to reproduce the N-channel audio signals.

Figure 2:
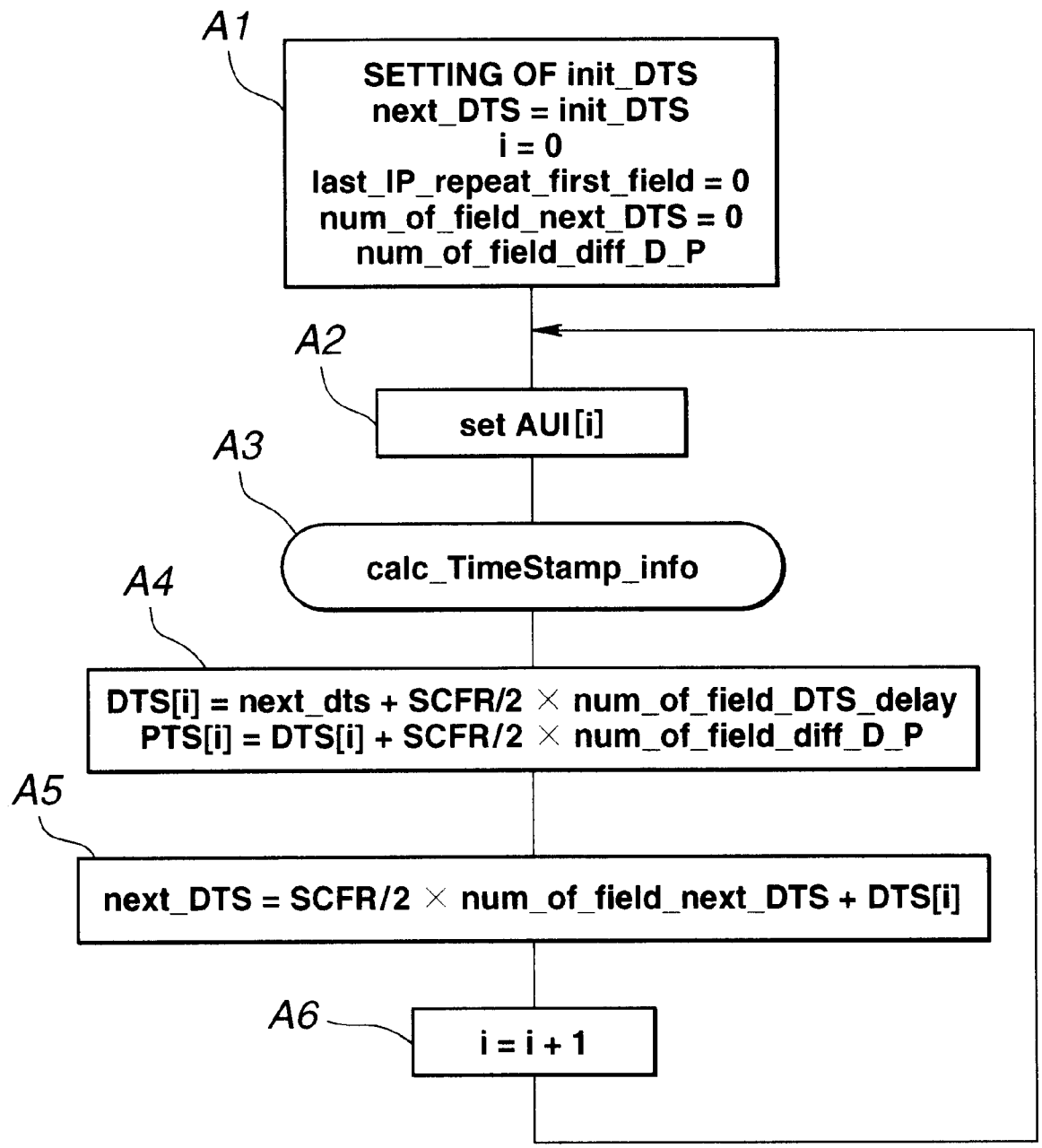
FIG. 2 is a flow chart showing how a decode time stamp and a presentation time stamp are calculated in the MPEG coding system in FIG. 1 in accordance with the invention.

During encoding, using the AUI of the video signal supplied from the video signal encoding unit 1, namely:

picture_size, picture_type, repeat_first_field, and the flag indicating when a big picture (big_picture) takes place, encoding apparatus 11 calculates time stamps PTS and DTS following the procedure shown in the flow chart in FIG. 2 and adds these two time stamps to the system stream.

At Step A1 in the flow chart in FIG. 2, initialization is performed as follows. The initial value of DTS (init_DTS) and a value for a next DTS (next_DTS) to be transmitted are set to be equal to each other.

i is set to "0". The value of i is a counting variable which counts up one for each access unit in the order of transmission. Last_IP_repeat_first_field is set to "0". The last_IP_repeat_first_field is used to convert a 3-2 pull-down image into an inverse 3-2 pull-down image for encoding. The variable is indicative of the value (0 or 1) of repeat_first_field (AUI) of a preceding I picture or P picture. num_of_field_next_DTS is set to "0". The num_of_field_next_DTS is the time, counted in the unit of fields, until a next DTS. Num_of_field_diff_D_P is also set to "0". The num_of_field_diff D-P is a difference between DTS and PTS values, counted in the unit of fields, for an I or P picture. The above variables can be calculated from access unit information AUI for a particular encoded data (picture_size, picture_type, repeat_first_field). The operation then proceeds to Step A2.

At Step A2, an information (AUI) for the i-th access unit is acquired. Then the operation proceeds to Step A3.

At next Step A3, a function calc_TimeStamp_infi( ) is performed following a specified procedure that will be described below to calculate values of num_of_field_next_DTS, num_of_field_delay and num_of_field_diff D_P.

At further Step A4, DTS[i] is set equal to next_DTS+ SCFR/2×num_of_field_DTS delay, and PTS[i] is equal to DTS[i]+SCFR2×num_of_field_diff_D_P to determine DTS and PTS concerning the i-th access unit as will be described in greater detail below. Operation then proceeds to Step A5.

At the next Step A5, next_DTS is equal to SCFR/2× num_of_field_next_DTS+DTS[i] to calculate the value of a next DTS. Operation then proceeds to Step A6.

At Step A6, the value of the variable i is increased by one. Next, the operation goes back to Step A2 where an AUI concerning a next access unit is acquired and the above processing is repeated to determine the values of DTS and PTS which are added for each next access unit.

Figure 3:
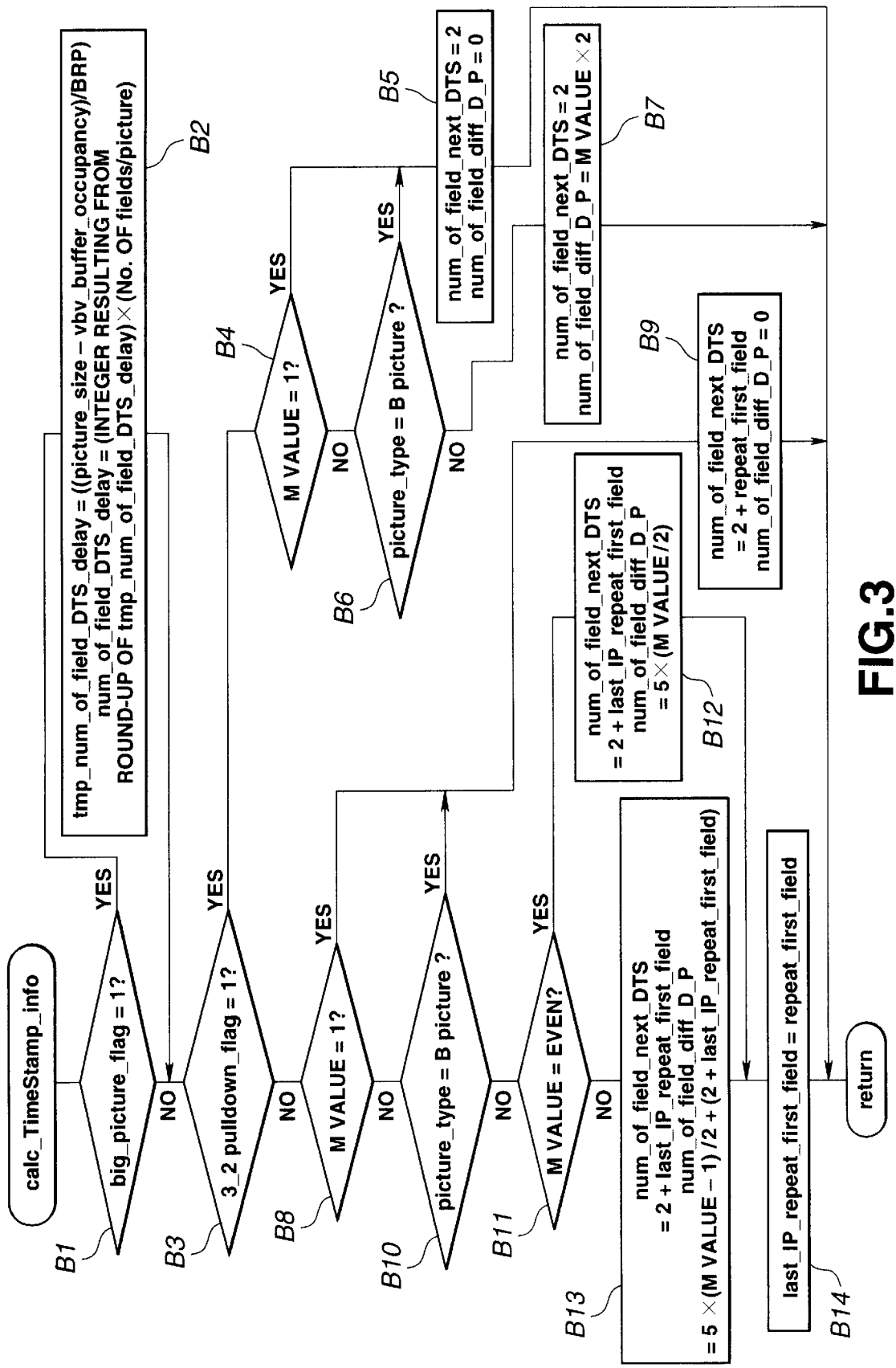
FIG. 3 is a flow chart showing how a function calc_TimeStamp_infi( ) in the flow chart in FIG. 2 is performed.
Figures 5A, 5B, 5C, 5D, 5E:
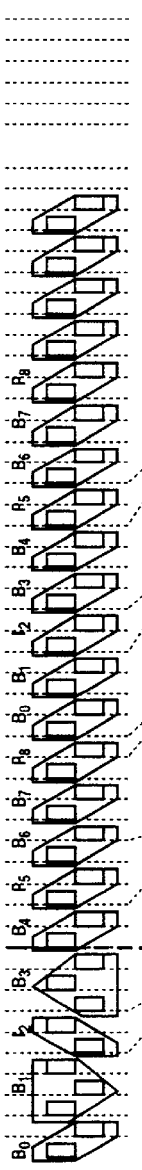
FIGS. 5A–5E illustrate how an image is input and output in accordance with the invention when the encoder automatically detects a 3-2 pull-down within itself and automatically gets into or out of an inverse 3-2 pull-down in the MPEG encoding system.

The function calc_TimeStamp_infi( ) at Step A3 is performed following the procedure shown in the flow chart in FIG. 3.

More particularly, at first Step B1 in the flow chart in FIG. 3, it is determined whether a flag (big_picture_flag) indicating that a big picture (big_picture) has been encoded is set to 1 or not. When the result of the determination at Step B1 is answered in the affirmative, namely, when big_picture_flag is equal to 1, operation proceeds to Step B2. When the result of the determination is answered in the negative, namely, when big_picture_flag is equal to 0, operation proceeds to Step B3.

At Step B2, tmp_num_of_field_DTS_delay is set equal to ((picture_size−size−vbv_buffer_occupancy)/ BRP), and num_of_field_DTS_delay is set equal to a value of the round-up of (tmp_num_of_field_DTS_delay) to the next integer×(number of fields/picture). The vbv_buffer_occupancy is a buffer occupancy (measured in the unit of bits) at which the decoder will overflow. The BRP is a bit rate per picture at which a bit stream is entered into the buffer, and (number of fields/picture) is a number of fields during one picture.

A num_of_field_DTS_delay is calculated under the assumption:
interlaced image: number of fields/picture=2
progressive image: number of fields/picture=1
3-2 pull-down image: number of fields/picture=2.
Therefore, num_of_field_DTS_delay is the value of a time from elimination of an underflow until a data of big_picture develops in the buffer in the decoder, counted in the unit of fields. The value is equivalent to a delay value for addition to the DTS. Operation then continues with step B3.

At Step B3, it is determined whether 3_2_pull_down_flag is set to 1 or not. The 3_2_pull_down_flag is indicative of whether an inverse 3-2 pull-down has been performed. If the 3_2_pull_down_flag is equal to 1, encoding has been performed after an inverse 3-2 pull-down process has been performed, while if the 3_2_pull_down_flag is equal to 0, encoding has been performed without an inverse 3-2 pull-down process. When the result of the determination at Step B3 is answered in the affirmative, namely, when 3_2_pull_down_flag is equal to 1, operation proceeds to Step B4. When the result of the determination is answered in the negative, namely, when 3_2_pull_down_flag is equal to 0, the operation proceeds to Step B8.

At Step B4, it is determined whether the M value is 1. When the result of the determination is answered in the affirmative, namely, when M value is equal to 1, operation proceeds to Step B5. However, if the result of the determination is answered in the negative, namely, if M value is not equal to 1, the operation proceeds to Step B6.

At Step B5, the value of num_of_field_next_DTS of the access unit is set to 2, and num_of_field_diff_D_P of the access unit is set to "0". Operation then proceeds to return end.

At Step B6, it is determined whether picture_type represents a B picture. When the result of the determination is answered in the affirmative, namely, picture_type represents a B picture, operation proceeds to Step B5. If the result of the determination is answered in the negative, namely, if picture_type does not represent a B picture, operation proceeds to Step B7.

At Step B7, the value of num_of_field_next_DTS of the access unit is set to 2 and num_of_field_diff_D_P of the access units set to M value×2. Operation then proceeds to return end.

At Step B8, it is determined whether M value is equal to 1. When the result of the determination is answered in the affirmative, namely, when M value is equal to 1, operation proceeds to Step B9. If the result of the determination is answered in the negative, namely, when M value is not equal to 1, the operation proceeds to Step B10.

At Step B9, the value of num_of_field_next_DTS of the access unit is set to 2+repeat_first_field and num_of_field_diff_D_P of the access unit is set to "0". Operation proceeds to return end.

At Step B10, it is determined whether picture_type represents a B picture. When the result of the determination is answered in the affirmative, namely, picture_type represents a B picture, operation proceeds to Step B9. If the result of the determination is answered in the negative, namely, picture_type does not represent a B picture, operation proceeds to Step B11.

At Step B11, it is determined whether the M value is even or not. If the result of the determination is answered in the affirmative, namely, when the M value is even, operation proceeds to Step B12. When the result of the determination is answered in the negative, namely, if the M value is not even, operation proceeds to Step B13.

At Step B12, the value of num_of_field_next_DTS for the access unit is set to 2+last_IP_repeat_first_field and num_of_field_diff_P for the access unit is set to 5×(M/2). The operation then proceeds to Step B14.

At Step B13, the value of num_of_field_next_DTS for the access unit is set to 2+last_IP_repeat_first_field and num_of_field_diff_D_P for the access unit is set to 5×(M−1)/2+(2+last_IP_repeat_first_field).

Further at Step B14, last_IP repeat first_field and repeat_first_field are set equal to each other. This value is used for the timing for a next I or P picture.

Thus a time stamp for a video signal is calculated for each access unit in accordance with the attributes of the access unit and is added as a time stamp to the transmitted data stream.

FIGS. 4A to 4E show how an image is input to and output from encoding unit 11 in accordance with the invention, when a big picture (big_picture) occurs when a flag (low_delay) for implementing a low delay is set in a sequence extension (sequence_extension) immediately after a sequence header code (sequence_header), as being a code for starting a video signal bit stream.

As is shown in FIG. 4A, when supplied with a 3-2 pull-down image, video signal encoding unit 1 of encoding apparatus 11 will take every 2 or 3 fields as one picture in an alternating manner. The input image having the following picture sequence:

I0, PI, P2, P3, P4, P5, P6, P7, P8, . . .
is encoded in the order of the following sequence:
I0, PI, P2, P3, P4, P5, P6, P7, P8, . . . ,
as is shown in FIG. 4B. FIG. 4B depicts the level of information stored in output buffer of the encoder according to the system time clock (STC). At STC=16, a first I0 picture is encoded, and an encoded bit is stored into the buffer. STCs are shown at intervals of 1 field. One-field interval is equivalent to SCFR/2. The one-field interval is simplified to take a value of SCFR/2=1.

As shown in FIG. 4C, nearly upon completion of the encoding of one picture, AUI (picture_size, picture_type, repeat_first_field, big_picture_flag) is output from the encoder. In the multiplexer, the AUI value is acquired and calculated to determine each of the time stamps DTS and PTS, as noted above in accordance with the flow charts of FIGS. 2 and 3.

When the flag (low_delay) for implementing a low delay is set, no bidirectionally predictive_coded pictures (B-Picture) will be included in the video sequence so DTS=PTS.

In this example, a big_picture develops in an I0 picture encoded at STC=38, so that the output buffer will overflow. However, this overflow is a buffer size for decoding by the decoder. The actual encoder has a larger buffer size, so the overflow will not cause any trouble during encoding or in transmission. Since a big_picture has been encoded at STC=38, a next PI picture is not encoded but removed from the data stream.

By calculating the time stamps PTS and DTS following the procedure shown in FIGS. 2 and 3 in accordance with the invention, the time stamps PTS and DTS of an I0 picture in which a big_picture has been encoded, and is to be developed will be: PTS=57; DTS=57.

FIG. 4D depicts the level of information stored in the buffer in the decoder according to STC and FIG. 4E shows how an image is output from the buffer. As seen from FIGS. 4A–4E at STC=18, a bit stream starts being acquired into the buffer, the first 10 picture is decoded at STC=33 according to the decode time stamp DTS, and presented at STC=33 according to the presentation time stamp PTS. The 10 picture in which a big picture (big_picture) has been encoded is decoded at STC=57 according to the decode time stamp DTS and presented at STC=57 according to the presentation time stamp PTS in accordance with the invention.

If decoded at STC=55, as would take place in the conventional MPEG apparatus, the 10 picture having the bit picture (big_picture) encoded therein would cause the output buffer to underflow, as shown by hatched lines in FIG. 4E. By decoding the 10 picture at STC=57 according to the decode time stamp DTS calculated as in accordance with the invention, and as noted above, however, the output buffer will not underflow when the 10 picture is decoded. It is therefore possible to avoid the underflow of the output buffer in the decoder, which would otherwise be caused by a big picture (big_picture).

Thus, in accordance with the invention, encoding apparatus 11 of MPEG system 10 generates at video signal encoding unit 1 thereof the following access unit information (AUI) of the video signal for delivery to the system coder and multiplexer 3:

picture_size, picture_type, repeat_first_field, a flag indicating the occurrence of a big picture(big_picture_flag), and M value and/or a flag indicating whether inverse 3-2 pull-down is to be performed or not.

Using this access unit information (AUI) supplied from the video signal encoding unit 1, system coder and multiplexer 3 calculates time stamps PTS and DTS for addition to a system data stream. Even when the M value is changed during an encoding procedure in video signal encoding unit 1 of encoding apparatus 11, system coder and multiplexer 3 can calculate appropriate time stamps PTS and DTS by varying the M values at Steps B7 to B9, B12 and B13 in the flow chart in FIG. 3 by the M value given as the AUI for the video signal bit stream from video signal encoding unit 1.

Also, when the encoder in video signal encoding unit 1 of encoding apparatus 11 automatically detects a 3-2 pull-down and automatically determines to perform, or not to perform an inverse 3-2 pull-down process, system coder and multiplexer 3 can calculate appropriate time stamps PTS and DTS since the flag given as the AUI for the video signal bit stream from video signal encoding unit 1 and indicating whether an inverse 3-2 pull-down process is to be performed or not is checked at Step B3 of the flow chart in FIG. 3. Thus, an input image can be correctly encoded according to the MPEG-2 video standard and decode it in a correct manner to provide an output image, as in the input and output of an image in FIGS. 5A to 5E.

It should be noted here that in the processing at Step B2 in the flow chart in FIG. 3, the calculation of the buffer occupancy (vbv_buffer_occupancy) causing the decoder to underflow is performed by the encoder in video signal encoding unit 1, and therefore need not be repeated by the system coder and multiplexer 3. Also, if a system coder and multiplexer on another channel is configured to calculate the vbv_buffer_occupancy, the amount of data processing will be considerably increased.

Therefore, in an alternative embodiment of the invention, the following parameters are calculated using the function calc_TimeStamp_infi( ) which is performed following the procedure in the flow chart in FIG. 3. These parameters noted below may be supplied as the AUI to system coder and multiplexer 3 from the video signal encoding section 1. These parameters are:

num_of_field_next_DTS num_of_field_diff_D_P num_of_field_DTS_delay

Figure 6:
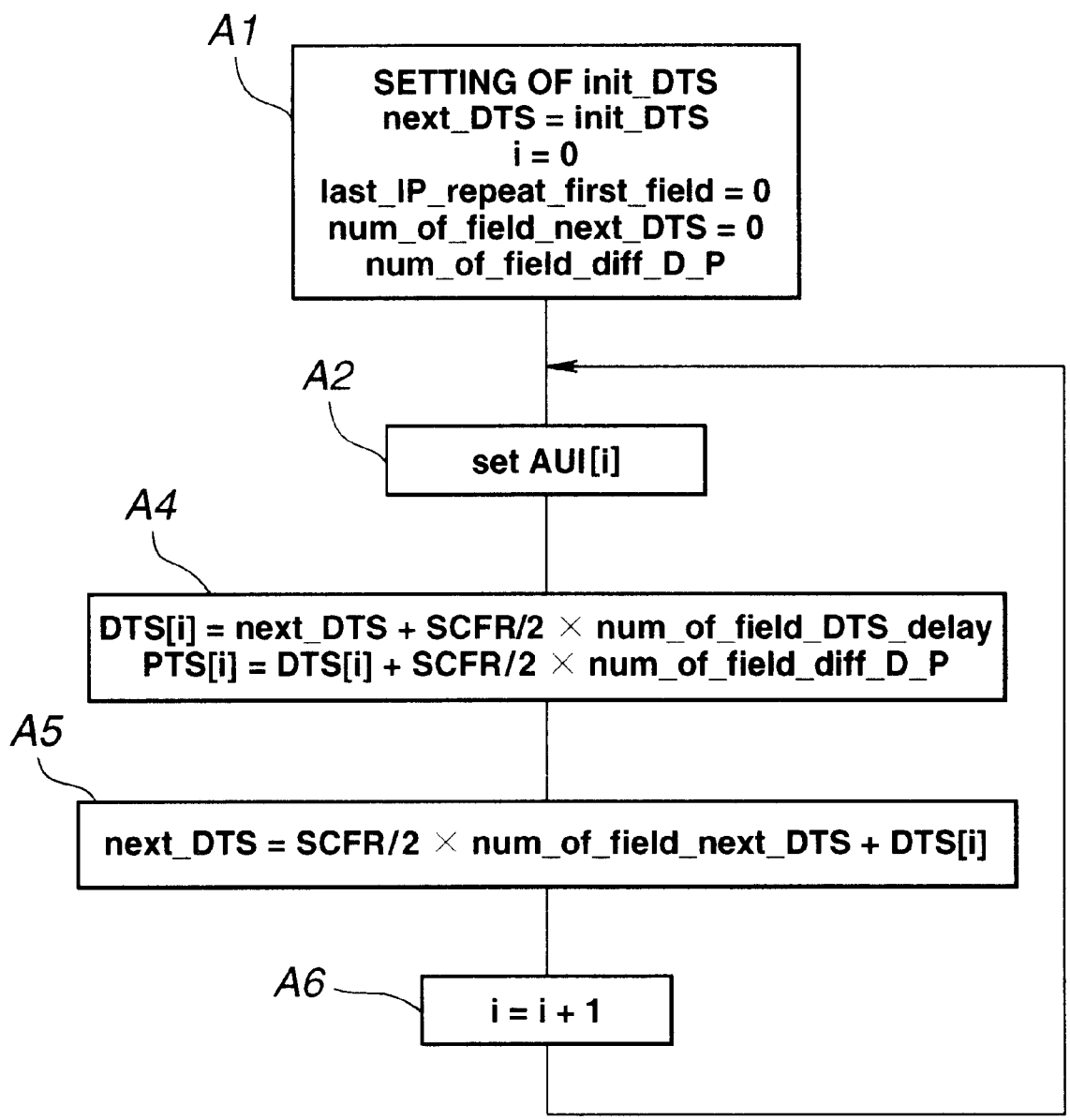
FIG. 6 is a flow chart showing how a decode time stamp and a presentation time stamp are calculated in accordance with an alternative embodiment of the invention in the MPEG encoding system.
Figure 8:
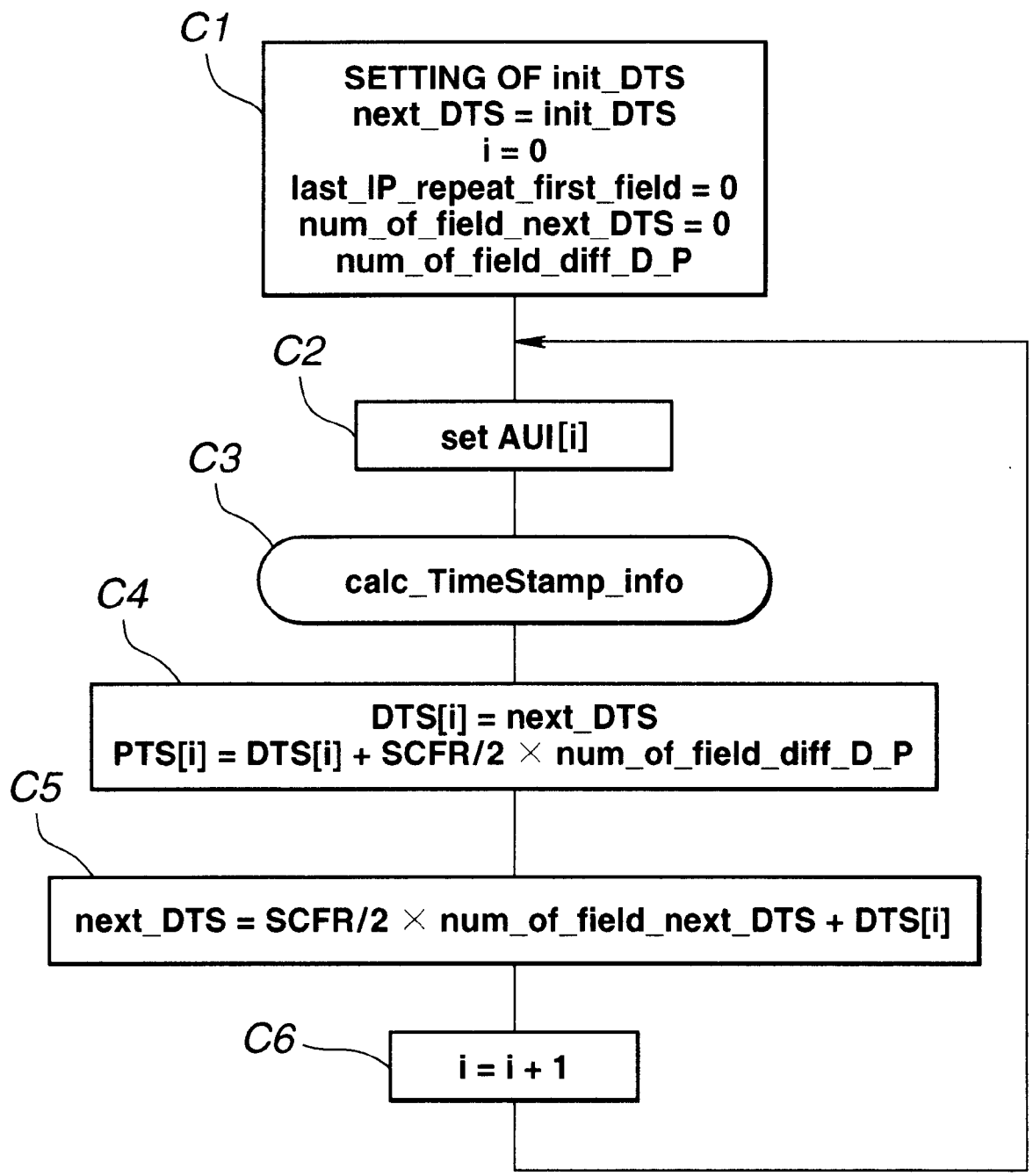
FIG. 8 is a flow chart showing how a decode time stamp and a presentation time stamp are calculated in a conventional encoding apparatus conforming to the MPEG standard.
Figure 9:
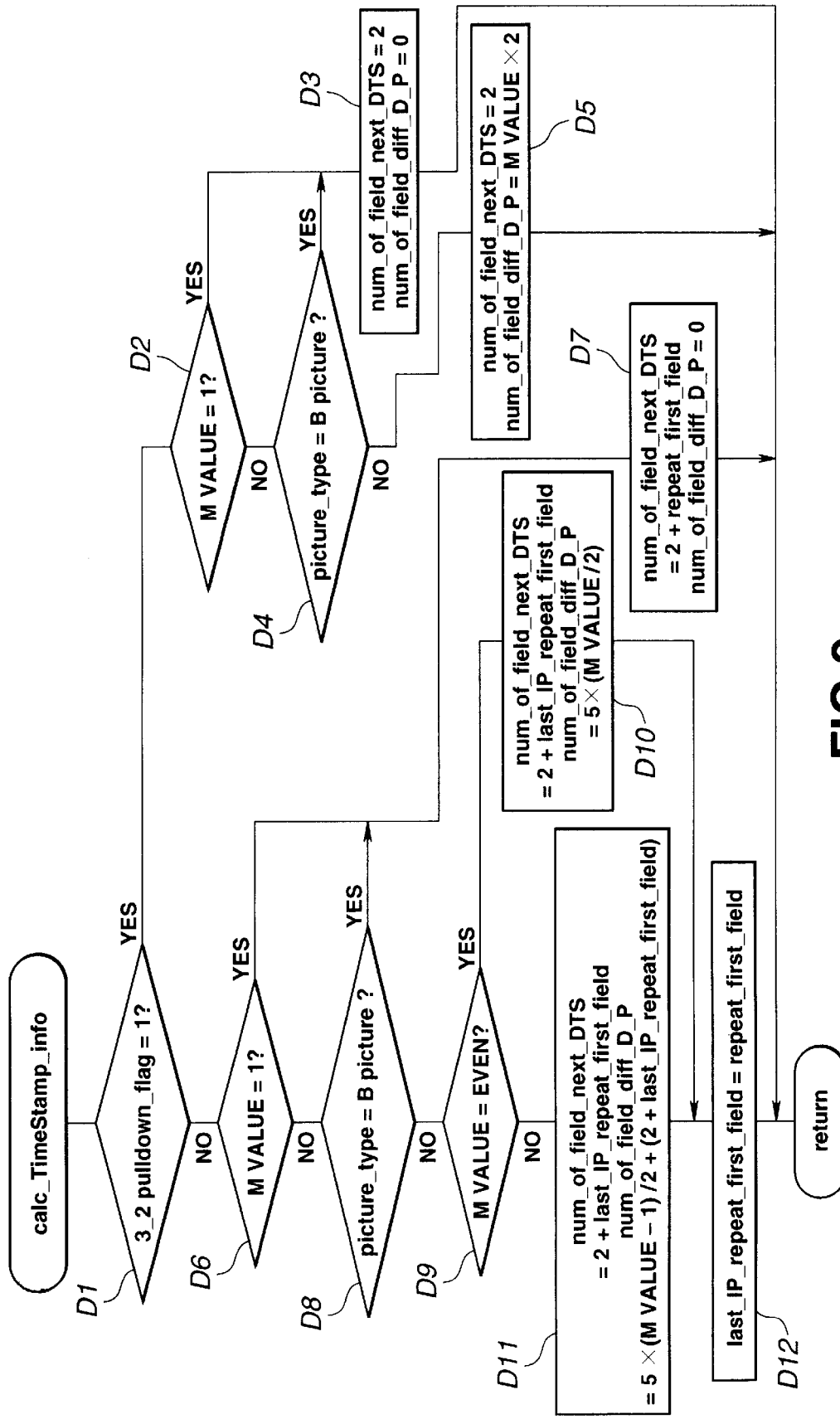
FIG. 9 is a flow chart showing how a function calc_TimeStamp_infi( ) is calculated in the flow chart in FIG. 8.

In accordance with this alternative embodiment of the invention, none of the calculations at Step A3 in the flow chart shown in FIG. 2 are required for system coder and multiplexer 3 as is shown in the flow chart of FIG. 6. FIG. 6 operates similarly to the flow chart of FIG. 2, but no calculation of calc_TimeStamp_info is performed. As shown in FIGS. 7A to 7E which depict the information level inca buffer when an image is being input and output therefrom. The input image can thus be correctly encoded according to the MPEG-2 video standard and decoded in a correct order to provide an output image.

As described above, in the video signal compressing method and apparatus for compressing a video signal and the compressed signal multiplexing method and apparatus according to the invention, for a system in which for insuring a synchronization between a plurality of compressed signals, a presentation time stamp and/or decode time stamp is multiplexed in a data stream for transmission, the following parameters can be generated as access unit information (AUI) for use to multiplex the compressed data of the video signal:

picture_size, picture_type, repeat_first_field, and a flag indicating the occurrence of a big picture (big_picture_flag).

These parameters can be used to calculate the presentation time stamp and/or the decode time stamp. Thus, it is possible to avoid any underflow of the decoder which would be caused by the occurrence of a big picture. The present invention can therefore provide a video signal compressing method and apparatus, and a compressed data multiplexing method and apparatus, adapted to avoid the underflow of the decoder which would be caused by the occurrence of a big picture.

Also, In the video signal compressing method and apparatus and the compressed signal multiplexing method and apparatus according to the present invention, the following parameters can be generated as access unit information (AUI) for use to multiplex the compressed data of the video signal:

picture_size, picture_type.

repeat_first_field, a flag indicating the occurrence of a big picture (big_picture_flag), and M value, to calculate a presentation time stamp and/or decode time stamp to multiplex the information in a data stream. Thus, it is possible to calculate appropriate time stamps PTS and DTS for even an encoder which freely changes the M value in the course of an encoding. Therefore, the present invention can provide a video signal compressing method and apparatus, and a compressed data multiplexing method and apparatus, adapted to calculate appropriate time stamps PTS and DTS for even an encoder which freely changes the M value in the course of an encoding.

Also, in the video signal compressing method and apparatus and the compressed signal multiplexing method and apparatus according to the present invention, the following can be generated as access unit information (AUI) for use to multiplex the compressed data of the video signal:

picture_size, picture_type, repeat_first_field, a flag indicating the occurrence of a big picture (big_picture_flag), and a flag indicating whether an inverse 3-2 pull-down is to be performed or not (3_2_pull_down_flag), to calculate a presentation time stamp and/or decode time stamp to multiplex the information in a stream. Thus, it is possible to calculate appropriate time stamps PTS and DTS for even an encoder which automatically detects a 3-2 pull-down within itself and automatically performs an inverse 3-2 pull-down as necessary. Therefore, the present invention can provide a video signal compressing method and apparatus, and a compressed data multiplexing method and apparatus, adapted to calculate appropriate time stamps PTS and DTS for even an encoder which automatically detects a 3-2 pull-down within itself and automatically gets into or output an inverse 3-2 pull-down.

Also, in the video signal compressing method and apparatus and the compressed signal multiplexing method and apparatus according to the present invention, the following can be generated as access unit information (AUI) for use to multiplex the compressed data of the video signal, each time one access unit is completely encoded,:

a time in which a next access unit is completely encoded, a time difference between a decode time stamp and presentation time stamp, and a delay value of the decode time stamp when a big picture takes place, to calculate the presentation time stamp and/or the decode time stamp in which a next access unit is completely encoded, time difference between. a decode time stamp and presentation time stamp and delay value of the decode time stamp when a big picture takes place and big_picture_flag to multiplex the information in a stream. Thus, it is possible to multiplex the decode and presentation time stamps into a stream with a reduced number of operations necessary for multiplexing. Therefore, the present invention can provide a video signal compressing method and apparatus, and a compressed data multiplexing method and apparatus, adapted to multiplex the decode and presentation time stamps into a stream with a reduced number of operations necessary for multiplexing.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific feature of the invention herein described, and all statements of the scope of the invention which, as a matter of language, might be said to fall therebetween.

What is claimed:

1. A video signal compressing method for compressing a video signal for a system in which for a synchronism between a plurality of compressed signals, a presentation time stamp (PTS) and/or a decode time stamp (DTS) which indicate when each access unit is to be presented and decoded by a particular decoder is multiplexed in a stream with compressed video signals for transmission, comprising the steps of:

compressing a video signal to generate a compressed signal; and generating the following as access unit information (AUI) for use to multiplex the compressed data of the video signal:

picture_size, picture_type, repeat_first_field, and a flag indicating the occurrence of a big picture (big_picture_flag), which is used in the multiplexing process to determine whether a num of field DTS delay should be added to said compressed video signals to prevent an underflow from occurring in a decoder buffer.

2. The method according to claim 1, wherein an M value is further generated as part of the access unit information (AUI) for use in multiplexing the compressed data of the video signal.

3. The method according to claim 1, wherein a flag indicating whether an inverse 3-2 pull-down is to be performed or not (3_2_pull_down_flag) is further generated as part of the access unit information (AUI) for use in multiplexing the compressed data of the video signal.

4. The method according to claim 1, wherein M value, and a flag indicating whether an inverse 3-2 pull-down is to be performed or not (3_2_pull_down_flag) are further generated as part of the access unit information (AUI) for use in multiplexing the compressed data of the video signal.

5. The method according to claim 1, wherein the following are further generated as part of the access unit information (AUI) for use in multiplexing the compressed data of the video signal:

a time in which a next access unit is completely encoded, a time difference between a decode time stamp and presentation time stamp, and a delay value of the decode time stamp when the big picture flag is set, each time one access unit is completely encoded.

6. A video signal compressing apparatus for compressing a video signal for a system in which for a synchronism between a plurality of compressed signals, a presentation time stamp (PTS) and/or decode time stamp (DTS) which indicate when each access unit is to be presented and decoded by a particular decoder is multiplexed in a stream with compressed video signals for transmission, comprising:

circuit for compressing a video signal to generate a compressed signal; and circuit for generating the following as access unit information (AUI) for use to multiplex the compressed data of the video signal:

a flag indicating picture_size, a flag indicating picture_type, a flag indicating repeat_first_field, and a flag indicating the occurrence of a big picture (big_picture_flag), which is used in the multiplexing process to determine whether a num of field DTS delay should be added to said compressed video signals to prevent an underflow from occurring in a decoder buffer.

7. The apparatus according to claim 6, wherein the access unit information generating circuit is adapted to further generate an M value as part of the access unit information (AUI) for use in multiplexing the compressed data of the video signal.

8. The apparatus according to claim 6, wherein the access unit information generating circuit is adapted to further generate a flag indicating whether an inverse 3-2 pull-down is to be performed or not (3_2_pull_down_flag) as part of the access unit information (AUI) for use in multiplexing the compressed data of the video signal.

9. The apparatus according to claim 6, wherein the access unit information generating circuit is adapted to further generate an M value and a flag indicating whether an inverse 3-2 pull-down is to be performed or not (3_2_pull_down_flag) as part of the access unit information (AUI) for use in multiplexing the compressed data of the video signal.

10. The apparatus according to claim 6, wherein the access unit information generating circuit is adapted to further generate the as the access unit information (AUI) for use to multiplex the compressed data of the video signal:

a time in which a next access unit is completely encoded, a time difference between a decode time stamp and presentation time stamp, and a delay value of the decode time stamp when the big picture flag is set, each time one access unit is completely encoded.

11. A compressed signals multiplexing method for multiplexing compressed signals for a system in which for a synchronism between a plurality of compressed signals, a presentation time stamp (PTS) and/or a decode time stamp is (DTS) which indicate when each access unit is to be presented and decoded by a particular decoder multiplexed in a stream with compressed video signals for transmission, comprising the steps of:

compressing a video signal to generate a compressed signal;

generating the following as access unit information (AUI) for use to multiplex the compressed data of the video signal:

picture_size, picture_type, repeat_first_field, and a flag indicating the occurrence of a big picture (big_picture_flag), which is used in the multiplexing process to determine whether a num of field DTS delay should be added to said compressed video signals to prevent an underflow from occurring in a decoder buffer; and calculating the presentation time stamp and/or the decode time stamp based on the picture_size, picture_type, repeat_first_field and big_picture_flag to multiplex the information in said stream.

12. The method according to claim 11, wherein M value are further generated as part of the access unit information (AUI) for use in multiplexing the compressed data of the video signal, the presentation time stamp and/or the decode time stamp being calculated based on the picture_size, picture_type, repeat_first_field, M value and big_picture_flag to multiplex the information in said stream.

13. The method according to claim 11, wherein a flag indicating whether an inverse 3-2 pull-down is to be performed or not (3_2_pull_down_flag) is further generated as part of the access unit information (AUI) for use in multiplexing the compressed data of the video signal, the presentation time stamp and/or the decode time stamp being calculated based on the picture size, picture_type, repeat_first_field, 3_2_pull_down_flag and big_picture_flag to multiplex the information in said stream.

14. The method according to claim 11, wherein M value and a flag indicating whether inverse 3-2 pull-down is to be performed or not (3_2_pull_down_flag) are further generated as part of the access unit information (AUI) for use in multiplexing the compressed data of the video signal, the presentation time stamp and/or the decode time stamp being calculated based on the picture size, picture_type, repeat_first_field, M value, 3_2_pull_down_flag and big_picture_flag to multiplex the information in said stream.

15. The method according to claim 11 wherein the following are further generated as part of the access unit information (AUI) for use in multiplexing the compressed data of the video signal, each time one access unit is completely encoded:

a time in which a next access unit is completely encoded;

a time difference between the decode time stamp and the presentation time stamp, and a delay value of the decode time stamp when a big picture takes place; and wherein the presentation time stamp and/or the decode time stamp are calculated based on the picture_size, picture_type, repeat_first_field, time in which a next access unit is completely encoded, time difference between the decode time stamp, the presentation time stamp and the delay value of the decode time stamp when the big picture takes place and big_picture_flag to multiplex the information in a stream.

16. A compressed signal multiplexing apparatus for multiplexing compress signals for a system in which for a synchronism between a plurality of compressed signals, a presentation time stamp (PTS) and/or a decode time stamp (DTS) which indicate when each access unit is to be presented and decoded by a particular decoder is multiplexed in a stream with compressed video signals for transmission, comprising:

a circuit for compressing a video signal to generate a compressed signal;

a circuit for generating the following as access unit information (AUI) for use to multiplex the compressed data of the video signal:

picture_size, picture_type, repeat_first_field, and a flag indicating the occurrence of a big picture (big_picture_flag), which is used in the multiplexing process to determine whether a num of field DTS delay should be added to said compressed video signals to prevent an underflow from occurring in a decoder buffer; and a multiplexer for calculating the presentation time stamp and/or the decode time stamp based on the picture_size, picture_type, repeat_first_field and big_picture_flag to multiplex the information in said stream.

17. The apparatus according to claim 16, wherein the access unit information generating circuit is adapted to further generate an M value as part of the access unit information (AUI) for use in multiplexing the compressed data of the video signal, wherein the multiplexer is adapted to calculate the presentation time stamp and/or the decode time stamp based on the picture_size, picture_type, repeat_first_field, M value and big_picture_flag to multiplex the information in said stream.

18. The apparatus according to claim 16, wherein the access unit information generating circuit is adapted to further generate a flag indicating whether an inverse 3-2 pull-down is to be performed or not (3_2_pull_down_flag) as part of the access unit information (AUI) for use in multiplexing the compressed data of the video signal;

wherein the multiplexer is adapted to calculate the presentation time stamp and/or the decode time stamp based on the picture_size, picture_type, repeat_first_field, 3_2_pull_down_flag and big_picture_flag to multiplex the information in said stream.

19. The apparatus according to claim 16, wherein the access unit information generating circuit is adapted to further generate an M value and a flag indicating whether an inverse 3-2 pull-down is to be performed or not (3_2_pull_down_flag) as part of the access unit information (AUI) for use in multiplexing the compressed data of the video signal;

wherein the multiplexer is adapted to calculate the presentation time stamp and/or the decode time stamp based on the picture_size, picture_type, repeat_first_field, M value, 3_2_pull_down_flag and big_picture_flag to multiplex the information in said stream.

20. The apparatus according to claim 16, wherein the access unit information generating circuit is adapted to further generate the following as part of the access unit information (AUI) for use in multiplexing the compressed data of the video signal, each time one access unit is completely encoded:

a time in which a next access unit is completely encoded, a time difference between a decode time stamp and presentation time stamp, and a delay value of the decode time stamp when a big picture takes place, wherein the multiplexer is adapted to calculate the presentation time stamp and/or the decode time stamp based on the picture_size, picture_type, repeat_first_field, time in which a next access unit is completely encoded, time difference between a decode time stamp and presentation time stamp and delay value of the decode time stamp when a big picture takes place and big_picture_flag to multiplex the information in a stream.

21. A video signal compressing method for compressing a video signal for a system in which for a synchronism between a plurality of compressed signals, a presentation time stamp (PTS) and/or a decode time stamp (DTS) which indicate when each access unit is to be presented and decoded by a particular decoder is multiplexed in a stream with compressed video signals for transmission, comprising the steps of:

compressing a video signal to generate a compressed signal; and generating the following as access unit information (AUI) for use to multiplex the compressed data of the video signal:

picture_size, picture_type, repeat_first_field, an M value, and a flag indicating the occurrence of a big picture (big_picture_flag), which is used in the multiplexing process to determine whether a num of field DTS delay should be added to said compressed video signals to prevent an underflow from occurring in a decoder buffer.

22. A video signal compressing method for compressing a video signal for a system in which for a synchronism between a plurality of compressed signals, a presentation time stamp (PTS) and/or a decode time stamp (DTS) which indicate when each access unit is to be presented and decoded by a particular decoder is multiplexed in a stream with compressed video signals for transmission, comprising the steps of:

compressing a video signal to generate a compressed signal; and generating the following as access unit information (AUI) for use to multiplex the compressed data of the video signal:

picture_size, picture_type, repeat_first_field, a flag indicative of whether an inverse 3-2 pull-down is to be performed or not (3_2_pull_down_flag), and a flag indicating the occurrence of a big picture (big_picture_flag), which is used in the multiplexing process to determine whether a num of_field DTS delay should be added to said compressed video signals to prevent an underflow from occurring in a decoder buffer.

23. A video signal compressing method for compressing a video signal for a system in which for a synchronism between a plurality of compressed signals, a presentation time stamp (PTS) and/or a decode time stamp (DTS) which indicate when each access unit is to be presented and decoded by a particular decoder is multiplexed in a stream with compressed video signals for transmission, comprising the steps of:

compressing a video signal to generate a compressed signal; and generating the following as access unit information (AUI) for use to multiplex the compressed data of the video signal:

a time in which a next access unit is completely encoded, a time difference between a decode time stamp and presentation time stamp, and a delay value of the decode time stamp when a big picture flag is set, which is used in the multiplexing process to determine whether a num of field DTS delay should be added to said compressed video signals to prevent an underflow from occurring in a decoder buffer, each time one access unit is completely encoded.

24. A video signal compressing apparatus for compressing a video signal for a system in which for a synchronism between a plurality of compressed signals, a presentation time (PTS) stamp and/or decode time stamp (DTS) which indicate when each access unit is to be presented and decoded by a particular decoder is multiplexed in a stream with compressed video signals for transmission, comprising:

circuit for compressing a video signal to generate a compressed signal; and circuit for generating the following as access unit information (AUI) for use to multiplex the compressed data of the video signal:

a flag indicating picture_size, a flag indicating picture_type, a flag indicating repeat_first_field, an M value, and a flag indicating the occurrence of a big picture (big_picture_flag), which is used in the multiplexing process to determine whether a num of field DTS delay should be added to said compressed video signals to prevent an underflow from occurring in a decoder buffer.

25. A video signal compressing apparatus for compressing a video signal for a system in which for a synchronism between a plurality of compressed signals, a presentation time stamp (PTS) and/or decode time stamp (DTS) which indicate when each access unit is to be presented and decoded by a particular decoder is multiplexed in a stream with compressed video signals for transmission, comprising:

circuit for compressing a video signal to generate a compressed signal; and circuit for generating the following as access unit information (AUI) for use to multiplex the compressed data of the video signal:
        a flag indicating picture_size,
        a flag indicating picture_type,
        a flag indicating repeat_first_field,
        a flag indicative of whether an inverse 3-2 pull_down is to be performed or not (3_2_pull-down-flag), and
        a flag indicating the occurrence of a big picture (big_picture_flag), which is used in the multiplexing process to determine whether a num of_field DTS delay should be added to said compressed video signals to prevent an underflow from occurring in a decoder buffer.

26. A video signal compressing method for compressing a video signal for a system in which for a synchronism between a plurality of compressed signals, a presentation time stamp (PTS) and/or a decode time stamp (DTS) which indicate when each access unit is to be presented and decoded by a particular decoder is multiplexed in a stream with compressed video signals for transmission, comprising the steps of:

compressing a video signal to generate a compressed signal; and generating the following as access unit information (AUI) for use to multiplex the compressed data of the video signal:
        a time in which a next access unit is completely encoded,
        a time difference between a decode time stamp and presentation time stamp,
        a delay value of the decode time stamp when the big picture flag is set, each time one access unit is completely encoded, and
        a flag indicating the occurrence of a big picture (big_picture_flag), which is used in the multiplexing process to determine whether a num of field DTS delay should be added to said compressed video signals to prevent an underflow from occurring in a decoder buffer.

\* \* \* \* \*